Feb. 7, 1967   A. PRICHODJKO ET AL   3,303,500
NAVIGATION AND POSITION FINDING SYSTEM, OPERATING ON THE
TRANSIT TIME PRINCIPLE, FOR PRODUCING PARALLEL
POSITIONAL PLANES
Filed March 22, 1963   9 Sheets-Sheet 1

Alexander Prichodjko
Albert Simianer
Hartmut Hipp
*Inventors*

By: *Spencer & Kaye*
Attorneys

Alexander Prichodjko
Albert Simianer
Hartmut Hipp
*Inventors*
By: *Spencer & Kaye*
Attorneys

Feb. 7, 1967     A. PRICHODJKO ETAL     3,303,500
NAVIGATION AND POSITION FINDING SYSTEM, OPERATING ON THE
TRANSIT TIME PRINCIPLE, FOR PRODUCING PARALLEL
POSITIONAL PLANES
Filed March 22, 1963     9 Sheets-Sheet 6

Alexander Prichodjk
Albert Simianer
Hartmut Hipp
*Inventors*
By: *Spencer & Kaye*
Attorneys Feb. 7, 1967    A. PRICHODJKO ET AL    3,303,500
NAVIGATION AND POSITION FINDING SYSTEM, OPERATING ON THE
TRANSIT TIME PRINCIPLE, FOR PRODUCING PARALLEL
POSITIONAL PLANES
Filed March 22, 1963    9 Sheets-Sheet 9

Fig. 12

Alexander Prichodjko
Albert Simianer
Hartmut Hipp
*Inventors*

By: *Spencer & Kaye*

Attorneys

United States Patent Office 3,303,500
Patented Feb. 7, 1967

3,303,500
NAVIGATION AND POSITION FINDING SYSTEM, OPERATING ON THE TRANSIT TIME PRINCIPLE, FOR PRODUCING PARALLEL POSITIONAL PLANES
Alexander Prichodjko, Oberelchingen, Kreis Neu Ulm, Albert Simianer, Thalfingen, Kreis Neu Ulm, and Hartmut Hipp, Gerlingen, Kreis Leonberg, Germany, assignors to Telefunken Patentverwertungs-G.m.b.H., Ulm (Danube), Germany
Filed Mar. 22, 1963, Ser. No. 267,306
Claims priority, application Germany, Mar. 24, 1962, T 21,830; Sept. 18, 1962, T 22,751
72 Claims. (Cl. 343—103)

The present invention relates to a system operating on the transit time principle for producing parallel positional planes for navigational purposes, the term "navigational purposes" being intended to comprehend not only actual navigation, including aerial navigation, in the ordinary sense, but all measuring purposes for determining and plotting the positions of various targets, crafts and other objects, and similar measurements involved, for example, in the science of geodesy.

There exist systems for guiding crafts, such as aircraft, as well as systems for enabling the position of crafts to be determined, in which a plurality of transmitters of known position produce navigational reference lines in space, so-called "lines of position." Such systems, which have been used for many years and which are known as "Loran," produce families of hyperbolas, each family of hyperbolas being produced by two spaced-apart transmitters. The position of a point in space can thus be fixed by means of two families of hyperbolas which intersect each other at a suitable angle. One serious drawback of this type of system is that it can not produce positional planes, i.e., planes which are parallel with the desired degree of accuracy and which allow the navigation and position finding to be carried out independently of altitude.

It is, therefore, an object of the present invention to provide a system which overcomes the above-mentioned drawbacks, namely, to provide a system for producing planes of position which are exactly parallel to each other. The system according to the present invention is based on the transit time principle; it produces parallel positional planes for navigational purposes and comprises a pair of transmitters located at two points that are spaced apart a known distance. According to the instant invention, the system has the following features:

(1) Each transmitter transmits a signal, referred to as a time marker, at a given instant $t_0$. More precisely, the two transmitters send out the time markers at instants $t_1$ and $t_2$, respectively, which may be equal to but in any case bear a known relationship to the instant $t_0$.

(2) At a receiving point, there is determined, firstly, the time difference $\Delta t_{12}$ between the instants $t_1'$ and $t_2'$ at which the two time markers arrive and, secondly, the time difference $\Delta t_m$ between the instant $t_0$ and an instant $t_{12}'$ which is intermediate the instants $t_1'$ and $t_2'$, the instant $t_{12}'$ preferably being the midpoint between the instants $t_1'$ and $t_2'$, if the instants $t_1$ and $t_2$ are identical with $t_0$; in case the instants $t_1$ and $t_2$ are different from each other, at least one of the instants to $t_1'$ and $t_2'$ is delayed in order to simulate the simultaneity of said instants $t_0$, $t_1$, and $t_2$ before determining the time differences $\Delta t_{12}$ and $\Delta t_m$.

(3) There is formed, at the receiving point, the product $\Delta t_p' = \Delta t_{12} \cdot \Delta t_m$.

Each positional plane which is at right angles to a straight line drawn through the two transmitter points is defined by a given value of this product $\Delta t_{12} \cdot \Delta t_m$. Thus, if the product is determined at the receiving point, there is obtained the particular positional plane in which the receiving point is located, and it can easily be proven mathematically that such a positional plane represents the geometric location for a given value of the above-mentioned product.

The time markers can be constituted by any suitable signal, e.g., pulses, rising flanks of square wave signals, phase shifts, passages through zero or the maxima of pure sinusoidal oscillations, amplitude or frequency changes, and so on. The time markers can be transmitted in any suitable manner, e.g., electromagnetically or acoustically.

As is explained more fully below, the system can be inverted, in a manner of speaking, by replacing the transmitters with receivers and the single receiver with a single transmitter. In this way, the position of, for example, a flying target aboard which the transmitter is carried, may be determined and plotted on the ground.

Additional objects and advantages of the present invention will become apparent upon consideration of the following description when taken in conjunction with the accompanying drawings in which.

Figure 1:
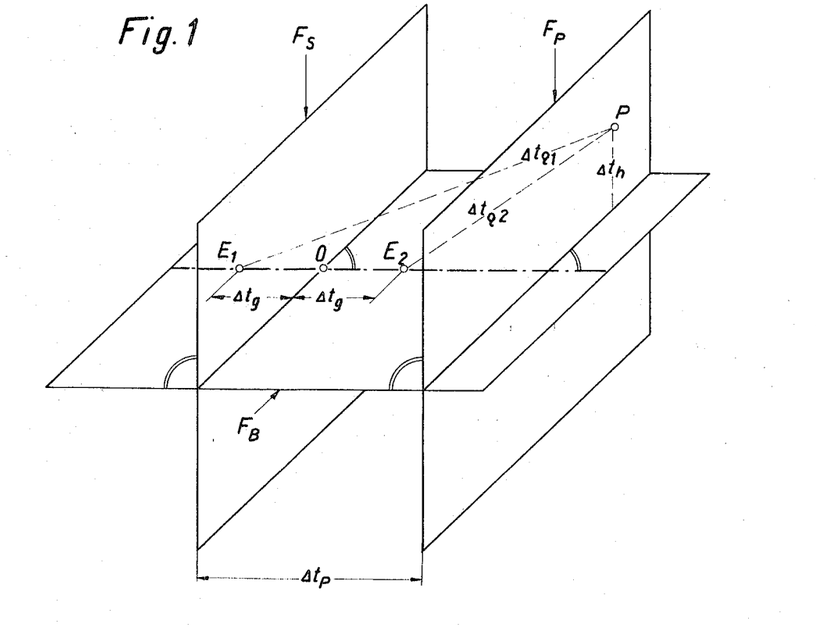
FIGURE 1 is a perspective representation showing the relative position of transmitting and receiving points, as well as positional planes produced by a system according to the present invention.

Referring now to the drawings and to FIGURE 1 thereof in particular, the same shows a transmitter plane $F_B$ containing a pair of transmitter points $E_1$, $E_2$, as well as the midpoint O of the line joining $E_1$ and $E_2$. The plane of symmetry $F_S$ of points $E_1$, $E_2$, i.e., the plane in which every point is equidistant from $E_1$ and $E_2$, passes through point O and intersects the line joining $E_1$ and $E_2$ at right angles. All distances in FIGURE 1, as well as FIGURES 2 through 5, are represented by values which are dimensions of time, this being possible because, with constant signal propagation speed, these values are directly proportional to the transit or propagation time. The distance between O and $E_1$ and between O and $E_2$ is equal to $\Delta t_g$, i.e., $\Delta t_g$ is equal to half the distance between $E_1$ and $E_2$. FIGURE 1 also shows the given coordinate plane $F_P$ which is parallel to the plane of symmetry $F_S$ and is spaced therefrom a distance $\Delta t_P$. Plane $F_P$ contains the receiver point P, the latter being at an altitude $\Delta t_h$ above the transmitter plane $F_B$ and being spaced $\Delta t_{p1}$ and $\Delta t_{p2}$ from points $E_1$ and $E_2$, respectively.

The time markers are transmitted from points $E_1$ and $E_2$ which are spaced apart a distance equal to $2\Delta t_g$, these time markers being, in practice, sent out in the form of similar pulse trains and being hereinafter referred to as informational time markers. The informational time markers transmitted from point $E_1$ at transmitting instants $t_1 = t_s + nT + \Delta t_1$ are hereinafter represented by $S_{i1}$ and the informational time markers transmitted from $E_2$ at instants $t_2 = t_s + nT + \Delta t_2$ are hereinafter represented by $S_i^2$. At the receiving point P, the signals $S_{i0}$, in the form of similar pulse trains, are generated at instants $t_0 = t_s + nT$. The signals $S_{i0}$ produced at point P are hereinafter referred to as reference time markers. In each case, $t_s$ is a fixed instant; $t_s + \Delta t_v$ is the instant of the first transmission or the generation of a first time marker $S_{iv}$ after the instant $t_s$ where $v = 0, 1, 2$; T is the period; and $n$ is the number of the time marker group where $n = 0, 1, 2, 3, \ldots$ . Each time marker group has one reference time marker and two informational time markers. The time increments $\Delta t_1$ and $\Delta t_2$ are predetermined. The time marker $S_{i1}$ is received at receiving point P at the instant $t_1' = t_s + nT + \Delta t_1 + \Delta t_{p1}$ and the time marker $S_{i2}$ is received at P at the instant $t_2' = t_s + nT + \Delta t_2 + \Delta t_{p2}$. If a conventional transmission is used, e.g., a pulse modulation type transmission, and if the particular transmission technique is known at the receiving end of the system, i.e., at P, the information time markers $S_{i1}$ and $S_{i2}$ in each time marker group can readily be identified at P.

Figure 1A:
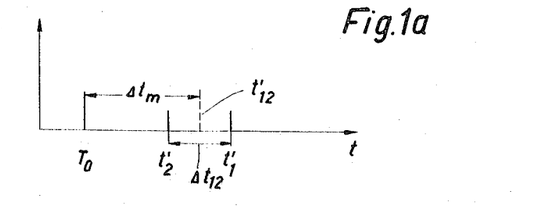
FIGURE 1a is a time plot which shows the relationship between various instants of time.

If $\Delta t_1 = 0$ and $\Delta t_2 = 0$, the reference time marker appears at the receiving point—as shown in FIGURE 1a—at the instant $t_0$, while the signals transmitted from transmitter points $E_1$ and $E_2$, i.e., the information time markers, appear at the instants $t_1'$ and $t_2'$, respectively.

If $\Delta t_1 \neq 0$ and/or if $\Delta t_2 \neq 0$, at least one time marker of the same time marker group is, in accordance with another feature of the present invention, so delayed—by means known per se—as to simulate the reception of the time markers of a time marker group in such a manner as if the informational time markers had been transmitted at the instant at which the reference time marker was produced.

Upon correction, the time markers are received at the following instants:

$S_{i0}$ at the instants $t_0'' = t_0 + \Delta t_0''$,
$S_{i1}$ at the instants $t_1'' = t_1' + \Delta t_1$,
$S_{i2}$ at the instants $t_2'' = t_2' + \Delta t_2''$.

there is determined from the instant $t_{12}'$, which separates the instants $t_1'$ and $t_2'$ in a given ratio $q$, the instant $t_{12}''$ which separates the instants $t_1''$ and $t_2''$ by the same ratio $q$. $\Delta t_v''$ represents any delay to which the time markers $S_{iv}$ may have been subjected for correction purposes.

The simple transit time difference is $$\Delta t_{12}'' = t_1'' - t_2'' \equiv \Delta t_{12}$$

If $$q = \left| \frac{t_1'' - t_{12}''}{t_2'' - t_{12}''} \right| = 1$$

i.e., if the instant $t_{12}''$ is selected so as to be exactly half way between $t_1''$ and $t_2''$, the imaginary transit time difference $\Delta t_m'' = \frac{1}{2}(t_1'' + t_2'') - t_0'' \equiv \Delta t_m$. The particular coordinate plane $F_P$ which is parallel to the plane of symmetry $F_S$ of the transmitter points $E_1$ and $E_2$ and in which the point P lies, is defined either by the product $$\Delta t_P' = |\Delta t_{12}''| \cdot \Delta t_m''$$

or by the product $\Delta t_P' = \Delta t_{12}'' \cdot \Delta t_m''$. The latter has the following advantages: in the first case, i.e., if only the absolute value of $\Delta t_{12}''$ is used, the value $\Delta t_P'$ defines the particular coordinate plane $F_P$ and the distance, in time, $\Delta t_P$ between $F_S$ and $F_P$, but does not define on which side of the plane $F_S$ the plane $F_P$ lies. If, however, one also uses the algebraic sign of the quantity $\Delta t_{12}''$, the resulting algebraic sign of $\Delta t_P$ and $\Delta t_P$ is indicative of the of the symmetry plane $F_S$ on which the coordinate plane $F_P$ is located.

In the system according to the present invention, there is a special case for $\Delta t_P'$ if $q = 1$, i.e., if $$\Delta t_P' = \frac{1}{2}(\Delta t^2_{p1} - \Delta t^2_{p2})$$

and the distance $2\Delta t_E$ between the transmitter points $E_1$ and $E_2$ is taken as unity. The numerical value of $\Delta t_P'$ is then the numerical value of the distance $\Delta t_P$ between the coordinate plane $F_P$ and the symmetry plane $F_S$. This special case can readily be produced with existing techniques, for example, by determining, evaluating, and/or indicating for $\Delta t_P'$ the product of $\Delta t_{12}''$ and $\Delta t_m''$, in which case $\Delta t_{12}''$ has to be the actual transit time differential between the two informational time markers of the same time marker group, and $\Delta t_m''$ has to be the actual time differential bewteen the instant $t_{12}''$ and the instant $t_0''$, the former being the instant which divides the two informational time markers of the same time marker group in the ratio assumed for this case, namely, $q = 1:1$, and the latter being the insatnt at which the reference time marker of the same group is produced.

In order to provide a network of coordinate planes with a system according to the present invention, there will have to be defined at least two families of parallel positional planes, the arrangement being such that one family of planes intersects the other family or families of planes at a desired angle or angles.

According to another feature of the present invention, each family of positional planes requires two transmitter points, although two or three families of positional planes do not require four but only at least three transmitter points, because each transmitter point can form together with the other transmitter points at least two pairs of transmitter points. According to another feature of the present invention, the desired angle between two families of positional planes obtained according to the invention is formed by making the angle of intersection between the straight line along which one pair of transmitter points are arranged and the straight line along which the other pair of transmitter points are arranged equal to the desired angle of intersection.

According to a particularly advantageous arrangement, a rectangular or Cartesian coordinate grid is defined by means of two transmitter point pairs, none of which coincide with any other, instead, the midpoint of the straight line joining one pair of transmitter points is also the midpoint of the straight line joining the other pair of transmitter points, the two straight lines being at right angles to each other. The advantage of such an arrangement is that the regions of maximum accuracy will overlap to the most favorable degree.

The system according to the present invention requires the reference time markers to be adjusted either initially or more frequently. Assuming that the receiver-side device for producing the reference time markers is sufficiently constant, and assuming also that the device is properly adjusted, at the beginning of the operation, the product $\Delta t_P'$ identifies the particular positional plane $F_P$ out of the family of positional planes defined by the transmitter pair.

The adjustment of the reference time markers presupposes that the positional plane within which point P is located at the time of adjustment is known. This, in the case of an aircraft, will occur while the craft is on the ground or when it overflies a marker beacon. It is particularly expedient if the reference time markers are so adjusted that the algebraic sign and/or the amount of the receiver-side product $\Delta t_P'$ and/or the distance $\Delta t_P$ are made equal to that of the known positional plane in which the point P is located during the adjustment.

Alternatively, the reference time markers can be adjusted if the transit time from a transmitter point to the receiver point P is known, and if the reference time marker is so adjusted that it leads the time marker received at P and pertaining to the same time marker group by a time interval equal to this transit time.

In the system according to the present invention, the time markers $S_{i1}$ and $S_{i2}$ have to be distinguished from each other, at P, only in order to determine on which side of the plane $F_S$ the plane $F_P$ is located. It is therefore not absolutely essential to determine, at the receiver, whether $S_{i1}$ has a longer or shorter transit time than $S_{i2}$. On the other hand, there has to be a direct or indirect identification, at the receiver side, of the time marker groups and this can be accomplished in a manner known per se, for example, by selecting sufficiently large time intervals between time marker groups. The informational time markers $S_{11}$ and $S_{12}$ within a time marker group can be identified in a manner known per se, for example, by letting one of the two transmitters send out its informational time marker of the same time marker group earlier, by a time interval equal to $2\Delta t_g$, than the other one of the transmitters. Consequently, the earlier informational time marker will be received ahead of the other informational time marker and be identified as such.

The identification of the various signals can be accomplished in any suitable manner. For instance, the various signals can be subjected to different pulse modulations, to different modulation frequencies, be transmitted at different frequencies, and so on.

The instants at which the informational time markers are transmitted can be fixed in any suitable manner. For instance, one of the transmitter points can receive the time markers sent out by the other transmitter point, and the thus-received signals can be used to fix the transmitting time of this other transmitter point. For example, the transmitter point $E_1$ can receive the informational time markers $S_{12}$ from $E_2$, and the thus-received signal can be used to synchronize the transmission time of the informational time markers $S_{11}$ by $E_1$.

The transmitting times can also be fixed by using a closed regulating circuit which controls at least the transmitting times of the two transmitters.

In case the informational time markers of the same time marker group are not sent out at the same instant at which the reference time marker of the same time marker group is produced, the receiver-side time markers of the same time marker group are so delayed, in a manner known per se, as to simulate the reception of the informational time markers of the same time group as if the informational time markers had been transmitted at the same instant at which the reference time marker was produced.

As stated above, the system according to the present invention can be inverted by replacing the two transmitter points with two receiver points and replacing the receiver point with a single transmitter point. The single transmitter transmits a signal — the informational time marker — at $t_0$; the time difference between the instants $t_1'$ and $t_2'$ at which the two receivers receive the time marker signal transmitted at $t_0$ is calculated by a suitable device which may be located at one of the receivers; the device calculates the time difference between $t_0$ and the instant $t_{12}'$ which lies between instants $t_1'$ and $t_2'$, preferably halfway between the latter; and the product is then obtained from the two calculated differences.

The inverted system described above can be adjusted if the position of the transmitter plane containing what is now the transmitting point P is known at the receivers, and if the algebraic sign and/or the amount of the product calculated at the receiver side is made equal to that of the known positional plane in which the point P is located at the time of the adjustment. Alternatively, the adjustment can be made if the transit time from transmitter to receiver is known, and if the reference time marker of the same group is made to lead the received time marker by a time interval equal to this transit time.

Figure 2:
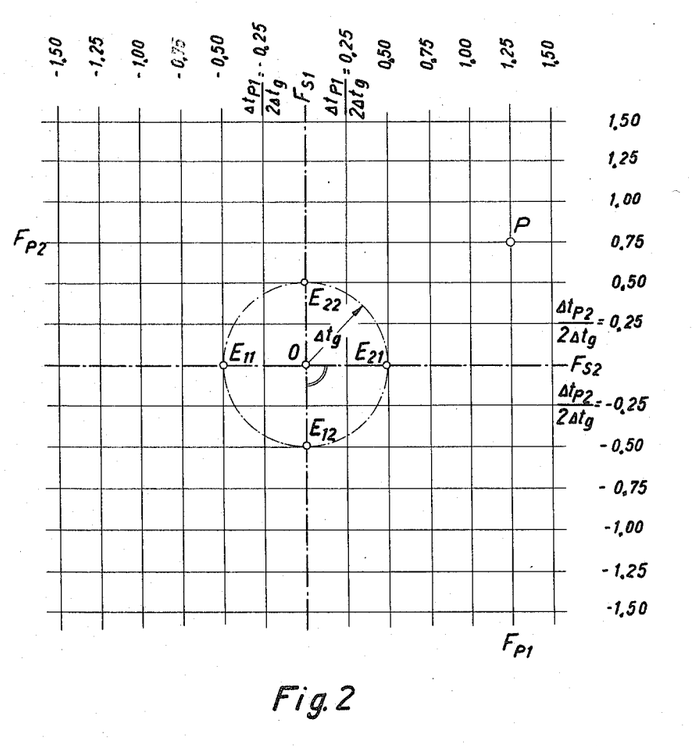
FIGURE 2 is a plan view of a transmitting plane in which the transmitting stations are arranged in accordance with the present invention.

FIGURE 2 is a plan view of a plane containing the transmitter points, there being two pairs of transmitter points arranged to produce a rectangular or Cartesian coordinate grid. The transmitter points $E_{11}$ and $E_{21}$ constitute one pair of transmitter points while points $E_{12}$ and $E_{22}$ constitute the other pair. The points $E_{11}$, $E_{21}$, $E_{12}$, $E_{22}$ are on a circle whose center is O and whose radius $\Delta t_g$. The plane of symmetry $F_{S1}$ of the points $E_{11}$, $E_{21}$ is at right angles to the plane of symmetry $F_{S2}$ of the points $E_{12}$, $E_{22}$. Point O is located on the rectilinear intersection of the planes of symmetry $F_{S1}$ and $F_{S2}$. FIGURE 2 also shows a point P which lies in the coordinate planes $F_{P1}$ and $F_{P2}$.

Assuming $2\Delta t_g = 333.3/\mu\text{sec.} \cong 100$ kilometers, then $\Delta t_{P1} = +1.25$. The distance of the given coordinate plane $F_{P1}$ from the plane of symmetry $F_{S1}$ is thus $$\Delta t_{P1} = +1.25 \cdot 2\Delta t_g \cong 125 \text{ km.}$$

Similarly, the numerical value for $\Delta t_{P2} = +0.75$, and the distance between coordinate plane $F_{P2}$ and symmetry plane $F_{S2}$ is $\Delta t_{P2} = +0.75 \cdot 2\Delta t_g \cong +75$ km.

The systems described above in connection with FIGURES 1 and 2 require the time standards forming part of the equipment to be very stable, i.e., constant, in order to obtain sufficiently accurate results. This, in practice, makes the systems relatively expensive.

Figure 3:
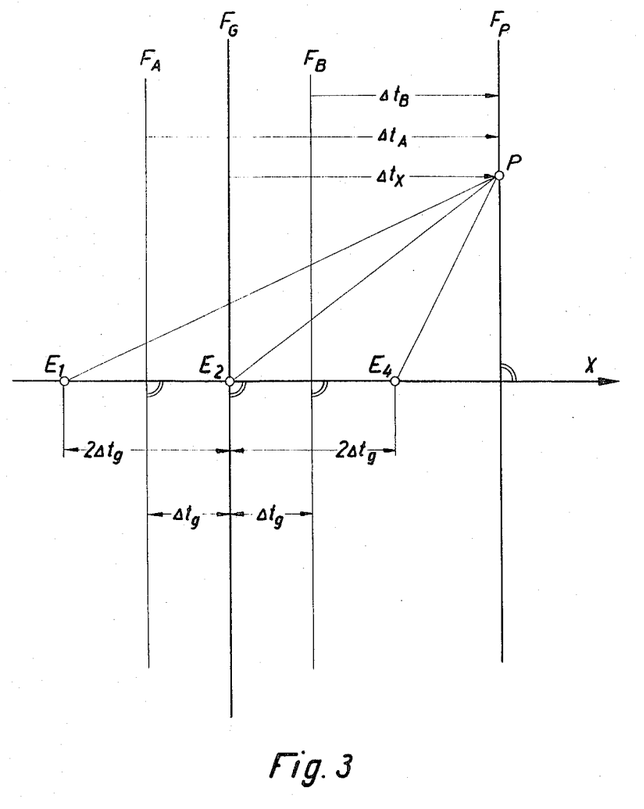
FIGURES 3, 4, and 5, show modifications of the systems of FIGURES 1 and 2.
Figure 4:
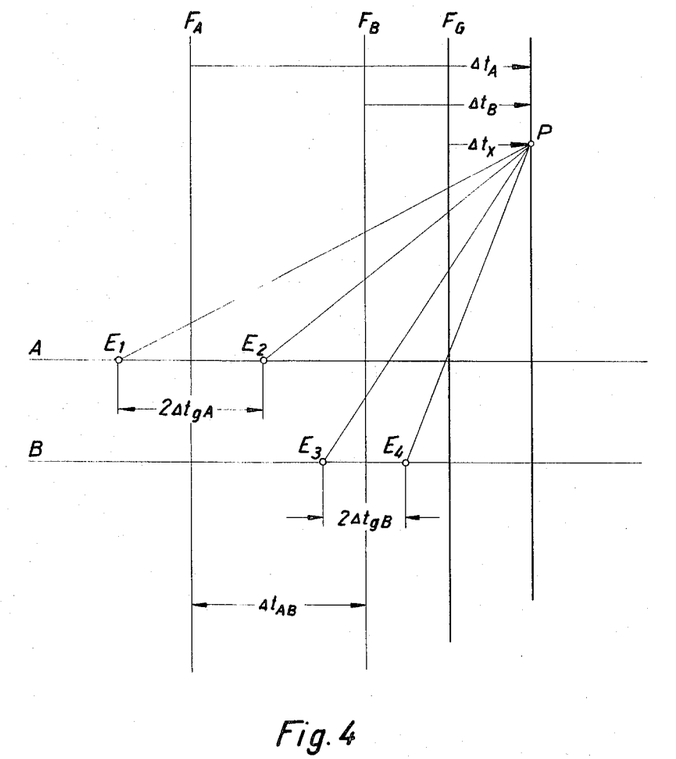
Figure 5:
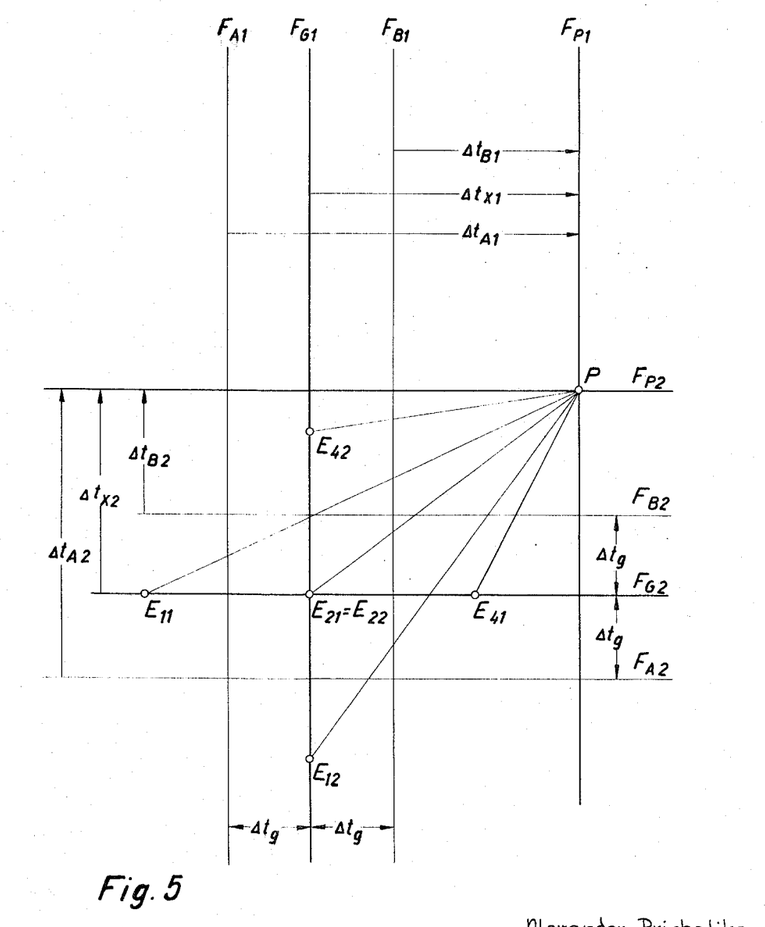

Accordingly, the systems described in connection with FIGURES 3, 4 and 5 are further developments of the present invention in which the requirement of exceedingly accurate time standards is substantially eliminated, in that any error introduced into the timing of the reference time marker will have no effect on the formation and measurement of parallel positional planes. This result is obtained as follows: the informational time markers are transmitted by two pairs of transmitter points which are arranged along two parallel straight lines which may, under certain circumstances, coincide with each other, as a result of which the comparison of the values of $\Delta t_P'$ which are obtained allows the timing of the reference time marker to be corrected at any time. This correction is, of course, not absolutely essential; instead, the positional planes can be determined directly without any time correction being done.

The modification mentioned above makes use of the system described in conjunction with FIGURES 1 and 2 and is characterized by the following features:

(1) The two transmitter pairs are located along two parallel straight lines A and B.

(2) The distance $x$, or a value which is equivalent to this distance $x$, which the receiving points is spaced from a common reference plane $F_G$ which is at right angles to the two parallel straight lines, is determined at the receiver side from the two products, this distance $x$ generally still being inaccurate due to inaccuracies in the instants at which the reference signals are produced, this, in turn, being the result of insufficient constancy of the reference signal generator.

(3) The instants at which the reference signals $S_{10}$ are produced are so shifted that the two resulting products giving the distance of the receiving point P from the common reference plane $F_G$ are equal.

The two parallel straight lines on which the two transmitter pairs are located may coincide with each other, in which case the transmitter point of one of the two pairs may also constitute a transmitter point of the other pair, as shown in FIGURE 3, in which one pair of the transmitter points includes the points $E_1$ and $E_2$ and the other pair the transmitter points $E_2$ and $E_4$, point $E_2$ thus being common to the two pairs. The distance $\overline{E_1 E_2}$ is, for example, equal to the distance $\overline{E_2 E_4}$ and the distances $2\Delta t_g$, which correspond to the $$\text{transit time} = \frac{\text{Distance}}{\text{Speed of Propagation}}$$

are equal to $$\frac{1}{c} \cdot \overline{E_1 E_2} = \frac{1}{c} \cdot \overline{E_2 E_4} = 2\Delta t_g$$

where $c$ is the speed of propagation of the signals.

The distance between point P and the common reference plane $F_G$ which is at right angles to the X-axis shown in FIGURE 3 is represented by $\Delta t_x$. The common reference plane $F_G$ is parallel to the plane of symmetry $F_A$ of points $E_1$ and $E_2$ and parallel to the plane of symmetry $F_B$ of points $E_2$ and $E_4$. In accordance with the operation described above in connection with FIG- URES 1 and 2, the distance $\Delta t_x$ which point P is spaced from the common reference plane $F_G$ is determined with the help of each pair of transmitter points. Thus, there is obtained, by means of the informational time markers sent out by transmitter points $E_1$ and $E_2$ $$\Delta t_x = \Delta t_A - \Delta t_g$$

and by means of the informational time markers sent out by transmitter points $E_2$ and $E_4$ $$\Delta t_x = \Delta t_B + \Delta t_g$$

where $\Delta t_A$ is the distance between point P and symmetry plane $F_A$ and $\Delta t_B$ is the distance between point P and symmetry plane $F_B$.

If the timing of the reference time marker $S_{10}$ produced at the receiver is in error, i.e., if the instant at which the reference time marker is produced is not identical with simultaneous, or simulatedly simultaneous, instants at which the informational time markers are sent out by the transmitters, there will be determined, at the receiver end of the system, not the actual transit time $\Delta t_x$ but, with the help of transmitter points $E_1$ and $E_2$, the inaccurate transit time and hence distance $\Delta t_{x\alpha}$ and, with the help of transmitter points $E_2$ and $E_4$, the inaccurate transit time and hence distance $\Delta t_{x\beta}$. Only if the reference time marker $S_{10}$ is produced at precisely the correct instant will $$\Delta t_{x\alpha} = \Delta t_{x\beta} = \Delta t_x$$

In order to correct the error in the reference time marker, a value obtained by forming the difference between $\Delta t_{x\alpha}$ and $\Delta t_{x\beta}$ is used for manually or automatically regulating the instants at which the reference time markers are produced in such a manner that the values $\Delta t_{x\alpha}$ and $\Delta t_{x\beta}$ become equal to each other.

In some cases, it is advantageous to calculate the timing error in producing the reference time marker. This error $\Delta t_f$ of the instant at which the reference time marker is produced with respect to the actual or simulated instant at which the informational time markers are transmitted can be calculated as follows:

$$\Delta t_f = \frac{(\Delta t_{x\alpha} - \Delta t_{x\beta}) 2 \Delta t_g}{(\Delta t_{p1} - \Delta t_{p2}) - (\Delta t_{p2} - \Delta t_{p4})}$$

which value can be used for manually or automatically correcting the instants at which the reference time markers are produced.

In the above equation, $\Delta t_{p1}$ = the distance between point P and $E_1$,
$\Delta t_{p2}$ = the distance between point P and $E_2$,
$\Delta t_{p4}$ = the distance between point P and $E_4$.

In the embodiment of FIGURE 4, which is basically similar to FIGURE 3 but shows the general application in which there are four transmitter points, i.e., the case where there is no transmitter point common to any one pair and in which the two lines on which the two transmitter points are located, respectively, do not coincide with each other but are in parallel spaced relationship. Thus, FIGURE 4 shows the two transmitter points $E_1$ and $E_2$ lying on a straight line A, the two points being spaced apart $2\Delta t_{gA}$, while the two transmitter points $E_3$ and $E_4$, which are spaced apart $2\Delta t_{gB}$, lie on a second straight line B which is parallel to line A. The plane of symmetry for points $E_1$ and $E_2$ is shown at $F_A$ while the plane of symmetry for points $E_3$ and $E_4$ is shown at $F_B$, the two planes of symmetry being spaced $\Delta t_{AB}$ from each other. The point P is spaced $\Delta t_x$ from the common reference plane $F_G$, $\Delta t_A$ from the plane of symmetry $F_A$, and $\Delta t_B$ from the plane of symmetry $F_B$.

For the general case shown in FIGURE 4, the time error $\Delta t_f$ is equal to $$\Delta t_f = \frac{\Delta t_{x\alpha} - \Delta t_{x\beta}}{\dfrac{\Delta t_{p1} - \Delta t_{p2}}{2\Delta t_{gA}} - \dfrac{\Delta t_{p3} - \Delta t_{p4}}{2\Delta t_{gB}}}$$

where $\Delta t_f$ = the time error of the reference signal; a negative sign for this value indicates that the faulty time markers are lagging.
$\Delta t_{p1}$ = the distance between point P and $E_1$,
$\Delta t_{p2}$ = the distance between point P and $E_2$,
$\Delta t_{p3}$ = the distance between point P and $E_3$,
$\Delta t_{p4}$ = the distance between point P and $E_4$.

If the instant at which the reference time markers are produced are corrected in accordance with the present invention, the other position coordinate plane needed to obtain a complete plot of the position of point P can, in accordance with another feature of the present invention, be obtained in a manner analogous to that described in connection with FIGURES 1 and 2, by letting one transmitter point of one pair of points (e.g., the points arranged on line A) coact with one of the transmitter points of the other pair of points (arranged on line B) to form another pair of transmitter points whose informational time markers cooperate with the already corrected reference time markers of the same time marker group. In this way, the additional positional plane may be created without using any additional transmitters.

According to another feature of the present invention a Cartesian coordinate grid is obtained by placing the points $E_3$ and $E_2$ in a straight line which is at right angles to the two parallel lines A and B. The coordinate which is then fixed with the informational time markers of these points and the reference time marker at P is then the other Cartesian coordinate, obtained in the manner described above. This, of course, means that the points $E_2$ and $E_3$ coact to constitute a transmitter pair.

It will be appreciated that the second coordinate cannot be obtained in the manner last described above if the lines A and B coincide with each other, as shown in FIGURE 3. However, all that is then needed is one further transmitter point which does not lie on the line containing the three points $E_1$, $E_2$ and $E_4$, which additional point is so selected that a line passing through it and one of the three points $E_1$, $E_2$, $E_4$—e.g., $E_2$—is at right angles to the line containing $E_1$, $E_2$, $E_4$. The second coordinate plane, which is at right angles to the first coordinate plane, can then be obtained by using the informational time markers from the additional point, additional informational time markers from point $E_2$, and the corrected reference time markers from P.

It will be seen from FIGURE 3 that the values for the distance of receiver P from the reference plane $F_G$, along the X-axis, will be the same outside of the distance $\overline{E_1E_4}$ even if the reference time makers are in error because the two simple time differences along the X-axis remain constant and are not equal to zero. It is true that this does not hold true within the region limited by $\overline{E_1E_4}$, but this is a relatively small region limited by two sections of a straight line and is therefore generally passed through very quickly, or even not touched at all, as, for example, in the case of an airplane in flight. Nevertheless, the system of FIGURE 3 can be modified so that even this minor disadvantage is eliminated.

If, for instance, the other Cartesian coordinate of the position of receiver P, namely, Y, is determined in a similar manner, i.e., by means of informational time markers of three transmitter points which line in reference plane $F_G$ and in the transmission plane $F_B$, two dissimilar Y-values are obtained so long as the timing of the reference time markers is in error and the point P does not lie on the Y-axis. If the instants at which the reference time markers are produced are shifted so that the two Y-values which are obtained are equal, then an accurate position plot can be obtained even along the X-axis. This, according to the present invention, may be done as follows:

(1) The two products representing a further coordinate which is needed to make it possible to obtain a fix of the position of point P are formed in the manner described above by means of the informational time markers from a set of two further pairs of transmitter points and the reference time markers.

(2) The two products are used to obtain the distance of the point P, or a value equivalent thereto, from a further reference plane which is at right angles to the parallel lines containing the further pairs of transmitter points; this distance may still contain a time error.

(3) The instants at which the reference time markers are produced are so shifted that the two values for the distance of the receiver point from the common reference plane are equal to each other and also that the two values for the distance of the receiver point from the further reference plane are equal to each other, i.e., the difference in each case is zero. The two parallel straight lines on which each set of two transmitter point pairs lie may be made to coincide; furthermore, transmitter points of the two further transmitter point pairs may be constituted by transmitter points of the original two transmitter point pairs.

FIGURE 5 shows the latter arrangement; the system is analogous to that shown in FIGURE 3 with the components shown in that figure being, in FIGURE 5, provided with the additional subscript "1" while the additional components carry the subscript "2."

The time error $\Delta t_f$ can be calculated as follows:

$$\Delta t_f = \frac{(\Delta t_{x\alpha 1} - \Delta t_{\gamma\beta 1} + \Delta t_{\gamma\alpha 2} - \Delta t_{x\beta 2}) 2\Delta t_g}{(\Delta t_{p11} - \Delta t_{p21}) + (\Delta t_{p41} - \Delta t_{p21}) + (\Delta t_{p12} - \Delta t_{p21}) + (\Delta t_{p12} - \Delta t_{p21})}$$

The above equation can be expanded for the general case in which there would be eight transmitter points, which, however, would—in practice—be uneconomical. Thus, while it may not always be possible—due, for instance, to the terrain in which the system is erected—to make do with precisely five transmitting points, the fewer physically separate points, the less expensive will be the overall installation and the simpler will be the equation for calculating the time error.

It is not absolutely essential to correct the instants at which the reference markers are produced in order to obtain a precise coordinate value. Instead, the assumed transit time difference pertaining to the coordinate value may be corrected and the precise coordinate value may then again be determined. Alternatively, the known time error of the reference time markers can be used to calculate the error of an inaccurately determined coordinate value and to correct the inaccurately determined coordinate value accordingly.

These systems, too, can be "inverted," in that transmitter points E can be made receiver points and the receiver point P a transmitter. This inversion is carried out in a manner analogous to that described above.

A substantial advantage of the embodiment of FIGURES 3, 4 and 5 is that the physically spaced-apart time standards, e.g. clocks, can easily be synchronized without it being necessary to know the distance between them. The present invention therefore provides a way in which the time markers are produced in synchronism with each other at physically spaced-apart locations. This can be done, for example, by means of distance measuring equipment in which the transit or propagation time of a signal is proportional to the distance covered, and recognition systems in which a user transmits a signal at a precisely fixed instant so that the receiver can determine the distance of the user as well as identify the user.

FIGURES 6 through 12 are block diagrams showing various systems according to the present invention, it being assumed that, for purposes of identification at the receiver side, the informational time markers $S_{i2}$ are transmitted at a time $\Delta t_u > 2\Delta t_g$ later than the informational time marker $S_{i1}$.

Figure 6:
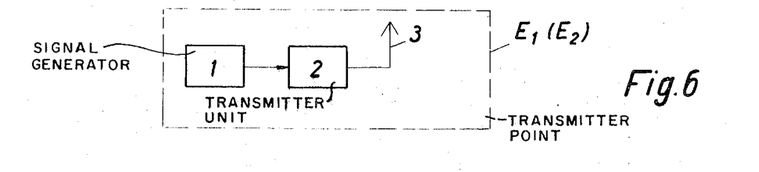
FIGURES 6, 7, and 8, are block diagrams of various modifications of transmitters forming part of a system according to the instant invention.

FIGURE 6 is a block diagram of a transmitter which sends out a time marker at the transmission instant. The transmitter comprises a signal generator 1 which produces the time marker signal, the transmitter unit 2 which receives the signal, and a transmitter antenna 3. Naturally, a single transmitter can feed a plurality of transmitter antennas located at different transmitter points.

Figure 7:
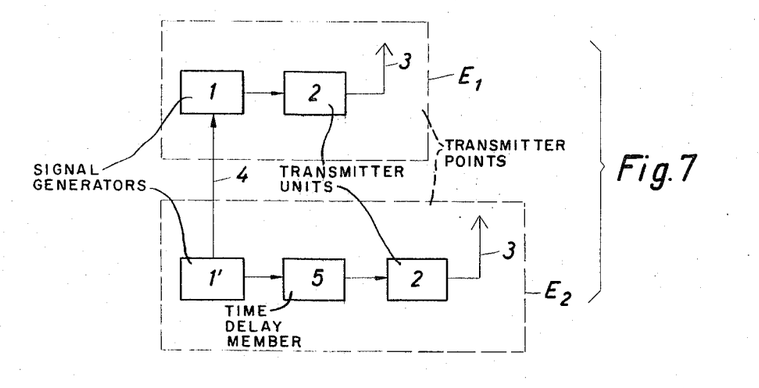
Figure 8:
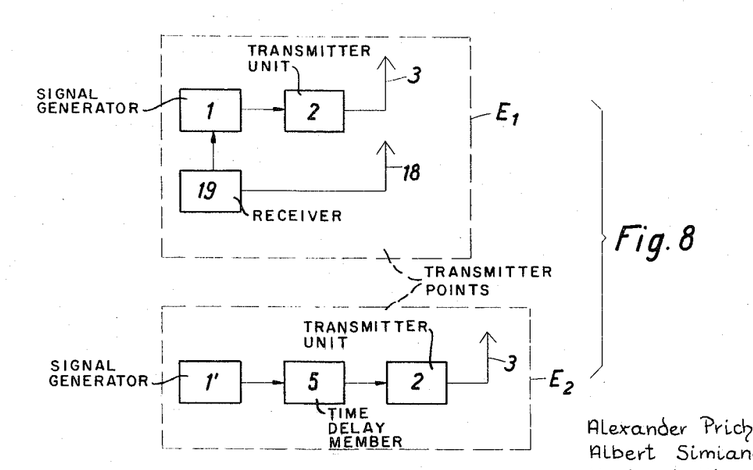

In order that the signals from the two transmitter points $E_1$ and $E_2$ will be correlated with each other, i.e., be transmitted in staggered time relationship, there can be two transmitters arranged as shown in FIGURE 7, the set located at point $E_2$ having a signal generator 1' which is connected to signal generator 1 of the set located at point $E_1$ via a cable 4 which allows synchronizing pulses to be sent. The time it takes for the synchronizing pulses to pass through cable 4 is taken into consideration by a time delay member 5 interposed between signal generator 1' and the transmitter unit 2 of the set located at point $E_2$, so that the signals transmitted by the two antennas 3 will be properly correlated to each other. Alternately, the cable 4, and under certain circumstances the time delay member 5, can be dispensed with if the signal generators are controlled by suitable time standards such as atomic clocks. Also, the cable 4 can, as shown in FIGURE 8, be replaced by a wireless channel where the receiver 19, equipped with a receiving antenna 18, controls the signal generator 1 of the set located at point $E_1$.

Figures 9, 11:
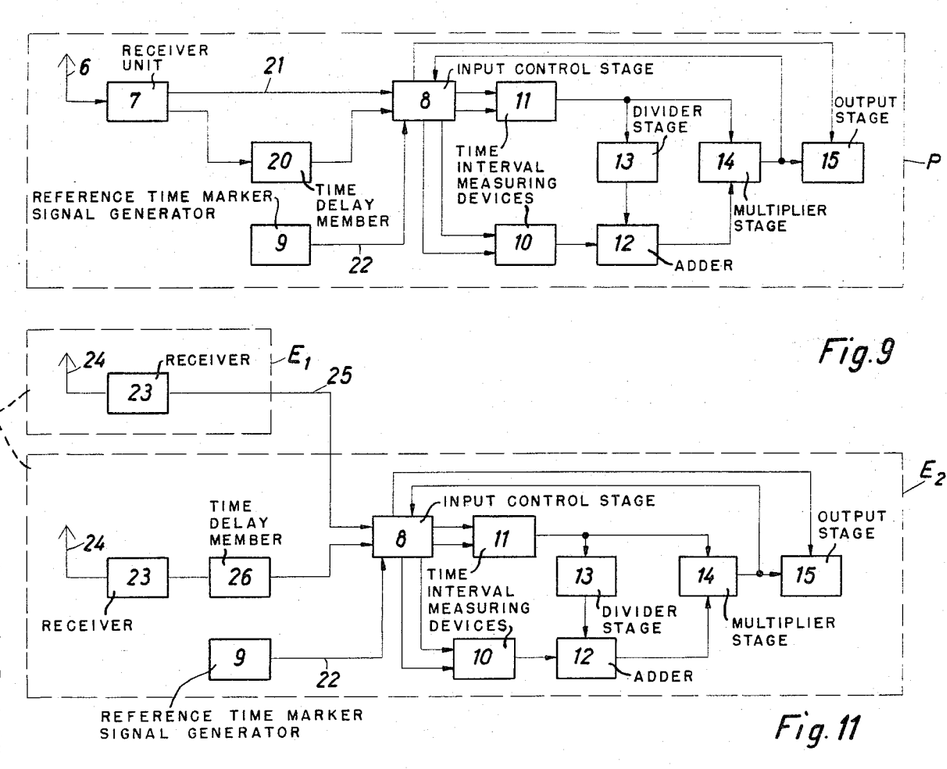
FIGURE 9 is a block diagram of a receiver forming part of a system according to the present invention.
FIGURES 11 and 12 are block diagrams of two embodiments of receivers, each of which may form a part of a system according to the present invention.

FIGURE 9 shows a receiving unit such as may be used at point P. The unit comprises a receiving antenna 6 connected to the actual receiver unit 7 which separates the incoming staggered informational time markers and applies them to separate outputs. This signal separation is carried out by conventional means, e.g. a flip-flop controlled gate circuit. The receiver unit 7 applies the informational time markers $S_{i1}$ to an input control stage 8 via a time delay member 20, and applies the informational time markers $S_{i2}$ directly, i.e., without delay, to control stage 8 via a line 21. A reference time marker signal generator 9 appleis the reference time markers to input stage 8 via a line 22. Inasmuch as the reference time markers are produced at the same time as the informational time markers $S_{i2}$ of the same group and the time interval between the reference time markers is always greater than the maximum transit time of one informational time marker, the input control stage receives, after it has received the reference time marker, the two informational time markers pertaining to each respective time marker. The arrangement of the input control stage is such that it is opened, i.e., made ready to receive the signals from receiver unit 7, upon the reception of a reference time marker. The stage 8 is then not closed until after it has received the second informational time marker following the opening of the stage, and can not again be opened by a new reference time marker until after the product $\Delta t_P'$ has been formed.

The input control stage 8 determines the algebraic sign of the product $\Delta t_P'$ on the basis of the timely sequence in which the informational time markers of the same time marker group arrive, and delivers the algebraic sign to an output stage 15 which may be an evaluating or an indicating stage.

The stage 8 applies the reference time marker and the informational time marker which is next applied to stage 8 to a time interval measuring device 10; both informational time markers are applied to a further time interval measuring device 11. The output of each of the devices 10 and 11 represents the time interval elapsed between the respective time markers applied thereto. The output of device 11 is applied to a divider stage 13 and to a multiplier stage 14. The divider stage 13 divides the measured value by 2 (here $q=1$) and applies the result to the adder 12 which adds this result to the output of the device 10. The output of the adder 12 is applied to the multiplier stage 14 which multiplies the values applied by 11 and 12 and puts out, as a numerical product value, the distance $\Delta t_x$, this product value being applied to the stage 15. The output of multiplier stage 14 is also applied to a resetting input of input stage 8 so that, now that the product has been formed, it can be re-opened by the next reference time marker signal from signal generator 9.

If the system is to be inverted, such as may be desired for monitoring an air space and plotting the position of aerial targets, the transmitter according to FIGURE 6 is located at point P while a receiver arrangement according to FIGURE 11 is located at points $E_1$ and $E_2$. The receiver arrangement according to FIGURE 11 comprises, at $E_1$, a receiver unit 23 connected to an antenna 24 which picks up the time markers sent out from P. These time markers received by the receiver at $E_1$ are the time markers $S_{i1}$. The arrangement of FIGURE 11 further includes the receiver shown in FIGURE 9, the latter being located at $E_2$ but lacking the antenna 6, the receiver 7, and the delay member 20, in place of which the receiver at $E_2$ has the antenna 24, the receiver 23, and the delay member 26. The receiver 23 at $E_2$ receives the time markers $S_{i2}$. The time markers $S_{i1}$ received by receiver 23 at $E_1$ are applied to the informational time marker input of control stage 8 via a connection 25 between the points $E_1$ and $E_2$ which may be constituted by a cable or radio link. The time markers $S_2$ received by receiver 23 at $E_2$ are applied to the other informational time marker input of stage 8 via delay member 26, the purpose of the latter being to delay the time markers $S_{i2}$ by the same interval as the time markers $S_{i1}$ are delayed by connection 25.

If, as explained above, a coordinate grid is to be used, each transmitter point of, for example, FIGURE 2, may be equipped with two transmitters such as are shown in FIGURE 6. The transmission of the time marker signals may be time-multiplexed, in which case the receiver-side equipment may be constituted as shown in FIGURE 9, the two coordinate values being calculated alternately. It is also possible to identify any given transmitter by means of the input control stage 8 (FIGURE 9).

If, in the generator of a coordinate grid, a transmitter point of one pair is to be identical to the transmitter point of the other pair, the individual transmitter installations can be located at the points $E_{11}$, O and $E_{22}$ shown in FIGURE 2.

Figure 12:
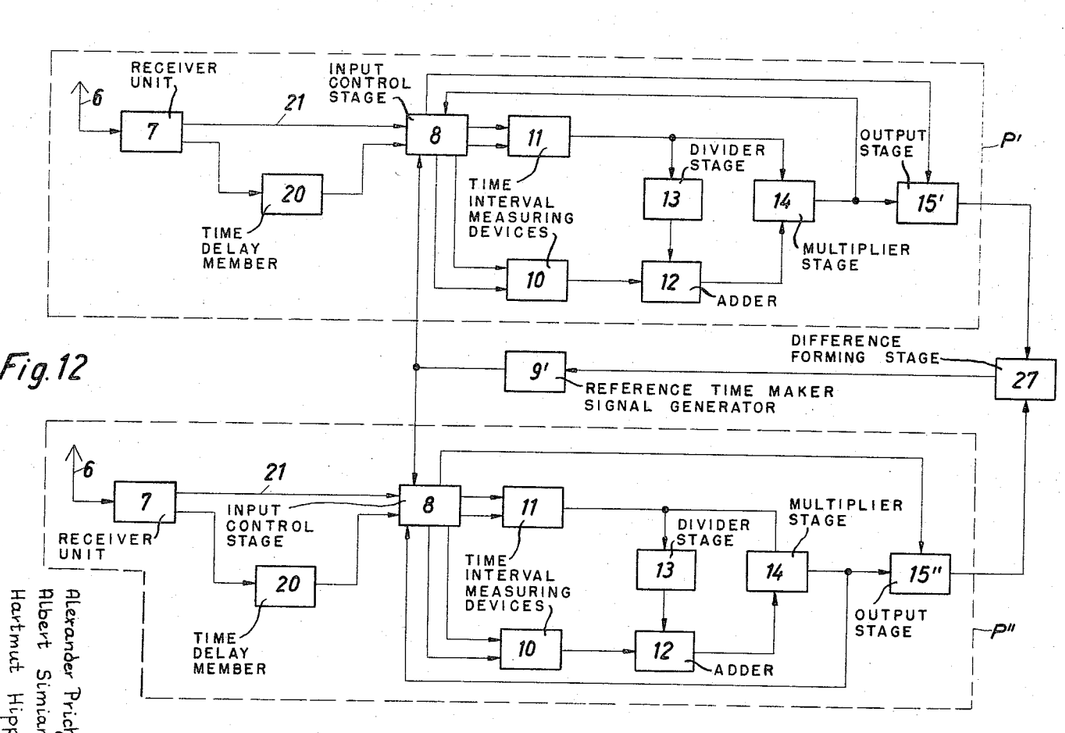

FIGURE 12 shows a system adapted for use in the embodiments of FIGURES 3, 4, and 5. Here it is assumed that the transmitter pairs $E_1$, $E_2$; $E_2$, $E_4$, are equipped with transmitters as shown in FIGURE 7, that at the receiver point P (FIGURE 3) there are two separate receivers P' and P'' substantially according to FIGURE 9 but differing therefrom in that they do not include the reference time marker generator 9, in place of which there is a single reference time marker signal generator 9' common to the two receivers, which single common generator 9' does not have to be synchronized with ground stations. The receivers P' and P'' also differ from the receiver of FIGURE 9 in that the two stages 15' do not determine and indicate the distance $\Delta t_x$ (FIGURE 3) but the distances $\Delta t_{x\alpha}$ and $\Delta t_{x\beta}$, respectively. In order to make $\Delta t_{x\alpha} = \Delta t_{x\beta}$, the outputs of stages 15' and 15'' are connected to a stage 27 which forms the difference between these two values and produces a control signal proportional to this difference $\Delta t_{x\alpha} - \Delta t_{x\beta}$, which control signal is applied to the reference time marker signal generator 9'. The timing of the reference time marker signal is so corrected by the control signal that for subsequent measurements of $\Delta t_{x\alpha}$ and $\Delta t_{x\beta}$, the difference $\Delta t_{x\alpha} - \Delta t_{x\beta}$ is as close to zero as possible.

Figure 10:
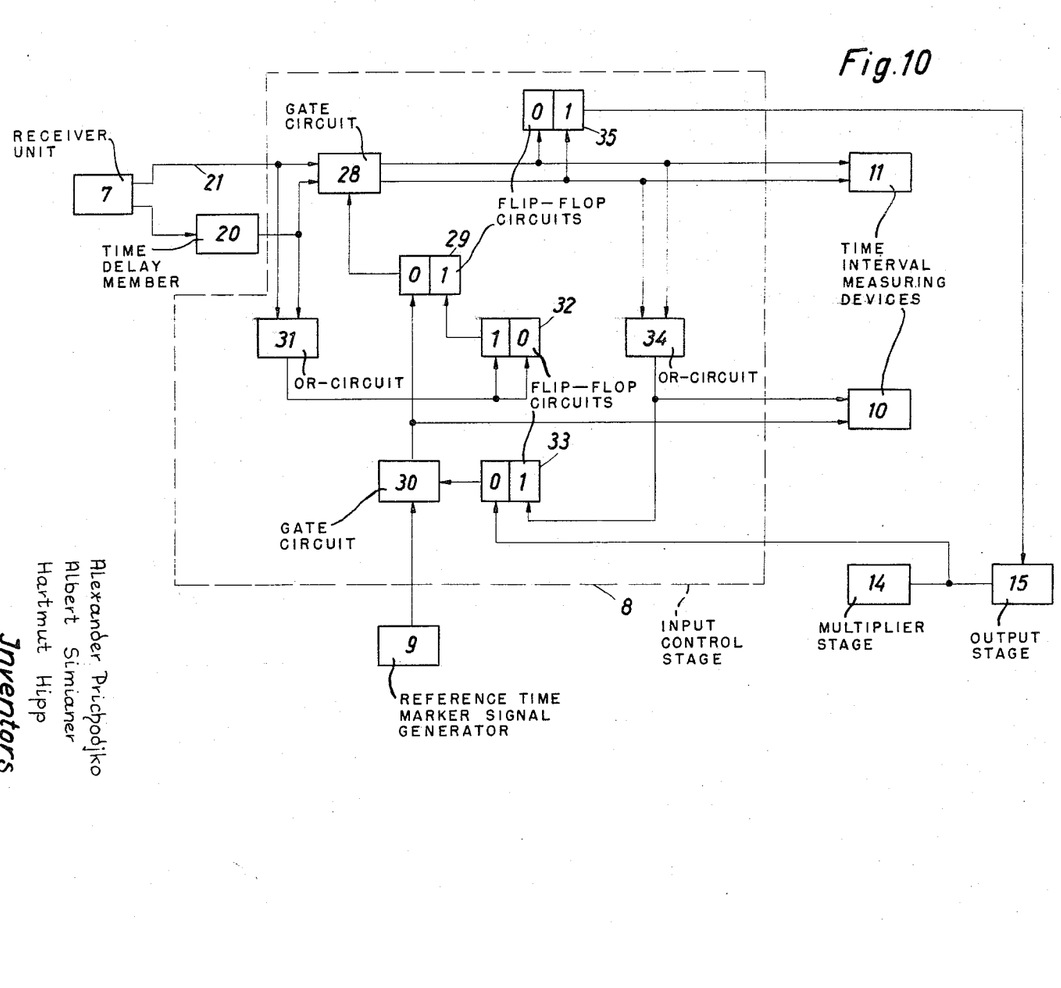
FIGURE 10 is a block diagram of one component of the receiver shown in FIGURE 9.

FIGURE 10 shows the details of the input control stage 8. This stage comprises a gate circuit 28 to which the line 21 and delay member 20 are connected, which gate circuit 28 is controlled by the reference time marker signal generator 9 via a gate circuit 30 and a flip-flop circuit 29. The line 21 and delay member 20 are also connected to an OR-circuit 31 whose output signal triggers a flip-flop circuit 32 so that the flip-flop circuit 29 is triggered into the illustrated position only by the informational time marker last appearing at the input of the gate circuit 28, whereupon the latter is again closed. When a signal appears at the output of the multiplier stage 14, the gate circuit 30 is opened by means of a further flip-flop circuit 33. The output of gate circuit 28 is also connected to an OR-circuit 34 whose output signal triggers the flip-flop circuit 33 into the illustrated position, thereby closing gate circuit 30. The output signals of OR-circuit 34 are applied to the time interval measuring device 10 as well as to the gate circuit 30. Also connected to the output of gate circuit 28 is yet another flip-flop circuit 35 by means of which the algebraic sign of $\Delta t_P$ is determined, the output signals of which flip-flop circuit 35 are applied to the output stage 15.

It will be understood that the above description of the present invention is susceptable to various modifications, changes, and adaptations, and the same are intended to be comprehended within the meaning and range of equivalents of the appended claims.

What is claimed is:

1. A system of the character described, comprising, in combination:
    (a) two transmitters located at two spaced-apart known transmitter points, respectively, for transmitting informational time markers at instants $t_1$ and $t_2$, respectively, which instants are identical with an instant $t_0$; and
    (b) receiving means for receiving said informational time markers and located at a receiver point spaced from said transmitter points, said receiving means including
        (1) means for determining the time difference $\Delta t_{12}$ between the instants $t_1'$ and $t_2'$ at which the informational time markers that were transmitted at instants $t_1$ and $t_2$, respectively, are received,
        (2) means for determining the time difference $\Delta t_m$ between the instant $t_0$ and an instant $t_{12}'$ which is intermediate said instants $t_1'$ and $t_2'$ at which said informational time markers are received, and
        (3) means for forming the product $\Delta t_{12} \cdot \Delta t_m$, thereby to define a particular positional plane which contains said receiver point and which is at right angles to a straight line drawn through said transmitter points and hence a plane containing said receiver point, the position of which plane is fixed with respect to said known transmitter points.

2. A system as defined in claim 1, further comprising two further transmitters located at two spaced-apart known transmitter points, respectively, a straight line drawn through said last-mentioned transmitter points being at an angle to the straight line drawn through the transmitter points at which the first-mentioned transmitters are located, said further transmitters operating in the same manner as the first-mentioned transmitters whereby a grid of positional planes is formed, and said receiving means also receiving the informational time markers from said further transmitters separately from the informational time markers transmitted by the first-mentioned transmitters thereby to obtain a second positional plane which contains the receiver point and which is at right angles to the straight line drawn through the further transmitters, whereby there is obtained a complete fix.

3. A system as defined in claim 2 wherein the two straight lines are at right angles to each other, thereby forming a Cartesian coordinate grid.

4. A system as defined in claim 3 wherein said transmitter points are so arranged that said straight lines bisect each other.

5. A system as defined in claim 3 wherein one of the first-mentioned transmitter points coincides with one of the further transmitter points.

6. A system as defined in claim 1 wherein said receiving means further comprise means for producing a reference time marker at said instant $t_0$.

7. A system as defined in claim 6, further comprising two further transmitters located at spaced-apart known transmitter points, respectively, a straight line drawn through said last-mentioned transmitter points being parallel to the straight line drawn through the transmitter points at which the first-mentioned transmitters are located, said further transmitters operating in the same manner as the first-mentioned transmitters and said receiving means receiving the informational time markers from said further transmitters separate from the informational time markers transmitted by the first-mentioned transmitters; said receiving means further comprising means for comparing the product defining the distance between the positional plane in which the receiver point is located with respect to a reference plane that is at right angles to said two lines as determined from the informational time markers transmitted by the first-mentioned transmitters with the product defining the distance between the positional plane in which the receiver point is located with respect to said reference plane as determined from the informational time markers transmitted by said further transmitters, and means responsive to any difference between the thus-determined products for so adjusting said means for producing the reference time marker as to make said difference equal to zero.

8. A system as defined in claim 7 wherein said two straight lines coincide with each other.

9. A system as defined in claim 8 wherein one of the first-mentioned transmitter points coincides with one of the further transmitter points.

10. A system as defined in claim 7 wherein one of said first-mentioned transmitters and one of said further transmitters together form a transmitter pair operating in the same manner as the two first-mentioned transmitters whereby a grid of positional planes is formed, said receiving means also receiving the informational time markers from said transmitter pair whereby a complete fix may be obtained.

11. A system as defined in claim 10 wherein a straight line drawn through said transmitter pair is at right angles to said parallel lines, thereby to form a Cartesian coordinate grid.

12. A system as defined in claim 7, further comprising four additional transmitters arranged, in a manner similar to the first four transmitters, on parallel lines which are at right angles to the parallel lines of the first four transmitters, said additional four transmitters being arranged to operate in a manner similar to the first four transmitters and said receiving means being arranged to cooperate with said additional four transmitters, whereby a complete Cartesian coordinate grid is formed allowing a complete fix of said receiver point to be taken.

13. A system as defined in claim 12 wherein at least some of said eight transmitter points coincide with each other.

14. A system as defined in claim 13 wherein there are but five transmitters located along two lines intersecting each other at right angles, one of the five transmitters being located at the intersection.

15. A system as defined in claim 7 wherein said means which are responsive to any difference between the thus-determined products comprise means for calculating the error with which said means for producing the reference time marker produces the same, and means responsive to said error calculating means for adjusting said reference time marker producing means.

16. A system as defined in claim 6 wherein one of said transmitters comprises a first signal generator for producing the informational time markers, and a first transmitter unit connected to said first signal generator for transmitting the informational time markers produced thereby, and wherein the other of said transmitters comprises a second signal generator for producing the informational time markers, and a second transmitter unit connected to said second signal generator for transmitting the informational time markers produced thereby, said two transmitters being synchronized to transmit their respective informational time markers in accordance with a desired timed relationship.

17. A system as defined in claim 16, further comprising synchronizing means interconnecting said two transmitters.

18. A system as defined in claim 17 wherein said synchronizing means comprise a connection between said two signal generators for causing said first signal generator to produce a time marker in response to signals produced by said second signal generator, said other transmitter further including a time delay member interposed between said second signal generator and said second transmitter unit for compensating for the time delay produced by said connection.

19. A system as defined in claim 17 wherein said synchronizing means comprise a radio link.

20. For use with two transmitters located at spaced-apart known transmitter points, respectively, which transmitters transmit informational time markers at instants $t_1$ and $t_2$, respectively, which instants are identical with an instant $t_0$, position fixing receiver means located at a receiver point spaced from the transmitter points and comprising, in combination:
   (1) means for determining the time difference $\Delta t_{12}$ between the instants $t_1'$ and $t_2'$ at which the informational time markers that were transmitted at instants $t_1$ and $t_2$, respectively, are received;
   (2) means for determining the time difference $\Delta t_m$ between the instant $t_0$ and an instant $t_{12}'$ which is intermediate said instants $t_1'$ and $t_2'$ at which said informational time markers are received; and
   (3) means for forming the product $\Delta t_{12} \cdot \Delta t_m$, thereby to define a particular positional plane which contains said receiver point and which is at right angles to a line drawn through the transmitter points and hence a plane containing said receiver point, the position of which plane is fixed with respect to the known transmitter points.

21. The combination defined in claim 20 wherein said receiving means further comprise means for producing a reference time marker at said instant $t_0$.

22. The combination defined in claim 21 wherein said means for producing said reference time marker are so adjusted, while the positional plane in which said receiver point is located is known, that said product forming means form a product which defines such known positional plane.

23. The combination defined in claim 21 wherein said means for producing said reference time marker are so adjusted, while the receiving means are at a receiver point the transit time of a signal between which receiver point and one of the transmitter points is known, that said instant $t_0$ leads the reception of a signal from said one transmitter point by said transit time.

24. The combination defined in claim 20 wherein said means for determining the time difference $\Delta t_{12}$ also determine the algebraic sign of said difference, thereby to give an indication of the sequence in which said instants $t_1'$ and $t_2'$ occur and hence of the side of the plane of symmetry of the known transmitter points on which said positional plane is located.

25. A system of the character described, comprising, in combination:
   (a) a transmitter located at a transmitter point and transmitting an informational time marker at an instant $t_0$; and
   (b) receiving means including
      (1) two receivers located at two spaced-apart known receiver points, respectively, and receiving said informational time marker at instants $t_1'$ and $t_2'$, respectively, (2) means for determining the time difference $\Delta t_{12}$ between said instants $t_1'$ and $t_2'$, (3) means for determining the time difference $\Delta t_m$ between the instant $t_0$ and an instant $t_{12}'$ which is intermediate said instants $t_1'$ and $t_2'$ at which said informational time marker is received at said receivers, respectively, and (4) means for forming the product $\Delta t_{12} \cdot \Delta t_m$, thereby to define a particular positional plane which contains the transmitter point and which is at right angles to a straight line drawn through said receiver points and hence a plane containing said transmitter point, the position of which plane is fixed with respect to said known receiver point.

26. A system as defined in claim 25 wherein said receiving means further comprise means for producing a reference time marker at said instant $t_0$.

27. A system as defined in claim 26, further comprising two further receivers located at spaced-apart known receiver points, respectively, a straight line drawn through said last-mentioned receiver points being parallel to the straight line drawn through the receiver points at which the first-mentioned receivers are located, said further receivers operating in the same manner as the first-mentioned receivers; said receiving means further comprising means for comparing the product defining the location of the positional plane in which said transmitter point is located as determined by the first-mentioned receivers with the product defining the location of such positional plane as determined by the further receivers, and means responsive to any difference between the thus-determined products for so adjusting said means for producing the reference time marker as to make said difference equal to zero.

28. For use with a transmitter which transmits an informational time marker at an instant $t_0$, a receiving system for fixing the position of the transmitter point at which the transmitter is located, said system comprising, in combination:

(1) two receivers located at two spaced-apart known receiver points, respectively, and receiving said informational time marker at instants $t_1'$ and $t_2'$, respectively;

(2) means for determining the time difference $\Delta t_{12}$ between said instants $t_1'$ and $t_2'$;

(3) means for determining the time difference $\Delta t_m$ between the instant $t_0$ and an instant $t_{12}'$ which is intermediate said instants $t_1'$ and $t_2'$ at which said informational time marker is received at said receivers, respectively; and (4) means for forming the product $\Delta t_{12} \cdot \Delta t_m$, thereby to define a particular positional plane which contains the transmitter point and which is at right angles to a straight line drawn through said receiver points and hence a plane containing the transmitter point, the position of which plane is fixed with respect to said known receiver points.

29. The combination defined in claim 28 wherein said receiving means further comprise means for producing a reference time marker at said instant $t_0$.

30. The combination defined in claim 29 wherein said means for producing said reference time marker are so adjusted, while the positional plane in which said transmitter point is located is known, that said product forming means form a product which defines such known positional plane.

31. The combination defined in claim 29 wherein said means for producing said reference time marker are so adjusted, while said transmitter is at a transmitter point the transit time of a signal between which transmitter point and one of the receiver points is known, that said instant $t_0$ leads the reception of a signal transmitted from said transmitter and received by the receiver located at said one receiver point by said transit time.

32. The combination defined in claim 28 wherein said means for determining the time difference $\Delta t_{12}$ also determine the algebraic sign of said difference, thereby to given an indication of the sequence in which said instants $t_1'$ and $t_2'$ occur and hence of the side of the plane of symmetry of the known receiver points on which said positional plane is located.

33. A position fixing system having a transmitter end and a receiver end, said system comprising, in combination:

(a) two transmitters, located at two respective known spaced-apart points, for transmitting informational time markers at instants $t_1$ and $t_2$, respectively, which instants are identical with an instant $t_0$;

(b) a receiver located at an unknown point;

(c) means for determining the time difference $\Delta t_{12}$ between instants $t_1'$ and $t_2'$ at which said receiver receives the informational time markers from said two transmitters;

(d) means for determining the time difference $\Delta t_m$ between the instant $t_0$ and an instant $t_{12}'$ which is intermediate said instants $t_1'$ and $t_2'$; and (e) means for forming the product $\Delta t_{12} \cdot \Delta t_m$, thereby to define a particular positional plane which contains the unknown point and which is at right angles to a straight line drawn through the two known points and hence a plane containing the unknown point, the position of which plane is fixed with respect to the two known points.

34. A system as defined in claim 33 wherein said informational time markers are constituted by signals in the form of one of the following: pulses, rising flanks of square wave signals, phase shifts, passages through zero of pure sinusoidal oscillation, the maxima of pure sinusoidal oscillations, amplitude changes, frequency changes.

35. A system as defined in claim 33 wherein each of said transmitters comprises a signal generator for producing the informational time markers, and a transmitter unit connected to said signal generator for transmitting the time markers.

36. A following fixing system having a transmitter end and a receiver end, said system comprising, in combination:

(a) two receivers located at two respective known spaced apart points;

(b) a transmiter located at an unknown point for transmitting an informational time marker at an instant $t_0$;

(c) means for determining the time difference $\Delta t_{12}$ between instants $t_1'$ and $t_2'$ at which said two receivers receive the informational time markers from said transmitter;

(d) means for determining the time difference $\Delta t_m$ between the instant $t_0$ and an instant $t_{12}'$ which is intermediate said instants $t_1'$ and $t_2'$; and (e) means for forming the product $\Delta t_{12} \cdot \Delta t_m$, thereby to define a particular positional plane which contains the unknown point and which is at right angles to a straight line drawn through the two known points and hence a plane containing the unknown point, the position of which plane is fixed with respect to the two known points.

37. A system as defined in claim 36 wherein said informational time markers are constituted by signals in the form of one of the following: pulses, rising flanks of square wave signals, phase shifts, passages through zero of pure sinusoidal oscillations the maxima of pure sinusoidal oscillations, amplitude changes, frequency changes.

38. A system as defined in claim 36 wherein said transmitter comprises a signal generator for producing the informational time markers, and a transmitter unit connected to said signal generator for transmitting the time markers.

39. In a system which comprises two transmitters located at spaced-apart known transmitter points, respectively, for transmitting informational time markers at instants $t_1$ and $t_2$, respectively, which instants are identical with an instant $t_0$; and receiving means located at an unknown receiver point spaced from the transmitter points and receiving the two informational time markers at instants $t_1'$ and $t_2'$, respectively, the improvement that said receiving means comprise:

(a) means for determining the time difference $\Delta t_{12}$ between said instants $t_1'$ and $t_2'$;

(b) means for determining the time difference $\Delta t_m$ between the instant $t_0$ and an instant $t_{12}'$ which is intermediate said instants $t_1'$ and $t_2'$; and (c) means for forming the product $\Delta t_{12} \cdot \Delta t_m$, thereby to define a particular positional plane which contains the unknown point and which is at right angles to a straight line drawn through the two known points and hence a plane containing the unknown point, the position of which plane is fixed with respect to the two known points.

40. Receiver means as defined in claim 39, further comprising means for producing a reference time marker at said instant $t_0$.

41. Receiver means as defined in claim 40 wherein said instant $t_{12}'$ is the midpoint between said instants $t_1'$ and $t_2'$.

42. Receiver means as defined in claim 41 wherein said receiving means incorporate the following circuit components:

(1) an input stage for receiving the reference time marker signal and two signals related to the informational time marker or markers, said input stage being opened upon the receipt of a reference time marker signal and not closed until after it has received the second informational time marker signal following the opening of the stage;

(2) a first time interval measuring device connected to said input stage for measuring the time interval between said reference time marker and the first received informational time marker signal;

(3) a second time interval measuring device also connected to said input stage for measuring the time interval between said two informational time marker signals;

(4) a divider stage connected to the output of said second time interval measuring device;

(5) an adder stage having two inputs connected, respectively, to the output of said first time interval measuring device and to the output of said divider stage;

(6) a multiplier stage having two inputs connected, respectively, to the output of said second time interval measuring device and to the output of said adder stage, the output of said multiplier stage being connected to a resetting input of said input stage to allow the same to be reopened by a subsequent reference time marker signal; and (7) an output stage connected to the output of said multiplier stage.

43. Receiver means as defined in claim 42 wherein said input stage has an output indicating the sequence in which the informational time marker signals are received, said output being connected to said output stage.

44. Receiver means as defined in claim 42 wherein said input stage comprises a first gate circuit to which the informational time marker signals are applied; a first flip-flop circuit for controlling said first gate circuit; a second gate circuit connected to one input of said first flip-flop circuit, said means for producing the reference time marker being connected to one input of said second gate circuit; a first OR-circuit to which the informational time marker signals are applied; a second flip-flop circuit having both of its inputs connected to the output of said first OR-circuit, the output of said second flip-flop circuit being connected to another input of said first flip-flop circuit; a third flip-flop circuit having its output connected to another input of said second gate circuit, one input of said third flip-flop circuit constituting said resetting input of said input stage and being connected to the output of said multiplier stage; and a second OR-circuit having its inputs connected to the output of said first gate circuit and its output connected to another input of said third flip-flop circuit; said first time interval measuring device being connected to the output of said second gate circuit and to the output of said second OR-circuit; and said second time interval measuring device being connected to the output of said first gate circuit.

45. Receiver means as defined in claim 44 wherein said input stage further comprises a fourth flip-flop circuit connected to the output of said first gate circuit, the output of said fourth flip-flop circuit being an indication of the sequence in which the informational time marker signals are received and being connected to said output stage.

46. In a system which comprises a transmitter located at an unknown transmitter point for transmitting an informational time marker at an instant $t_0$; and receiving means including two receivers located at two spaced-apart known receiver points, respectively, and receiving the informational time marker at instants $t_1'$ and $t_2'$, respectively, the improvement that said receiving means comprise:

(a) means for determining the time difference $\Delta t_{12}$ between said instants $t_1'$ and $t_2'$;

(b) means for determining the time difference $\Delta t_m$ between the instant $t_0$ and an instant $t_{12}'$ which is intermediate said instants $t_1'$ and $t_2'$; and (c) means for forming the product $\Delta t_{12} \cdot \Delta t_m$ thereby to define a particular positional plane which contains the unknown point and which is at right angles to a straight line drawn through the two known points and hence a plane containing the unknown point, the position of which plane is fixed with respect to the two known points.

47. Receiver means as defined in claim 46, further comprising means for producing a reference time marker at said instant $t_0$.

48. Receiver means as defined in claim 47, wherein said instant $t_{12}'$ is the midpoint between said instants $t_1'$ and $t_2'$.

49. Receiver means as defined in claim 48 wherein said receiving means incorporate the following circuit components:

(1) an input stage for receiving the reference time marker signal and two signals related to the informational time marker or markers, said input stage being opened upon the receipt of a reference time marker signal and not closed until after it has received the second informational time marker signal following the opening of the stage;

(2) a first time interval measuring device connected to said input stage for measuring the time interval between said reference time marker and the first received information time marker signal;

(3) a second time interval measuring device also connected to said input stage for measuring the time interval between said two informational time marker signals;

(4) a divider stage connected to the output of said second time interval measuring device;

(5) an adder stage having two inputs connected, respectively, to the output of said first time interval measuring device and to the output of said divider stage;

(6) a multiplier stage having two inputs connected, respectively, to the output of said second time interval measuring device and to the output of said adder stage, the output of said multiplier stage being connected to a resetting input of said input stage to allow the same to be reopened by a subsequent reference time marker signal; and (7) an output stage connected to the output of said multiplier stage.

50. Receiver means as defined in claim 49 wherein said input stage has an output indicating the sequence in which the informational time marker signals are received, said output being connected to said output stage.

51. Receiver means as defined in claim 49 wherein said input stage comprises a first gate circuit to which the informational time marker signals are applied; a first flip-flop circuit for controlling said first gate circuit; a second gate circuit connected to one input of said first flip-flop circuit, said means for producing the reference time marker being connected to one input of said second gate circuit; a first OR-circuit to which the informational time marker signals are applied; a second flip-flop circuit having both of its inputs connected to the output of said first OR-circuit, the output of said second flip-flop circuit being connected to another input of said first flip-flop circuit; a third flip-flop circuit having its output connected to another input of said second gate circuit, one input of said third flip-flop circuit constituting said resetting input of said input stage and being connected to the output of said multiplier stage; and a second OR-circuit having its inputs connected to the output of said first gate circuit and its output connected to another input of said third flip-flop circuit; said first time interval measuring device being connected to the output of said second gate circuit and to the output of said second OR-circuit; and said second time interval measuring device being connected to the output of said first gate circuit.

52. Receiver means as defined in claim 51 wherein said input stage further comprises a fourth flip-flop circuit connected to the output of said first gate circuit, the output of said fourth flip-flop circuit being an indication of the sequence in which the informational time marker signals are received and being connected to said output stage.

53. A system of the character described, comprising, in combination:
(a) two transmitters located at two spaced-apart known transmitter points, respectively, for transmitting informational time markers at instants $t_1$ and $t_2$, respectively, which instants are different from each other but bear a known relationship to an instant $t_0$; and
(b) receiving means for receiving said informational time markers and located at a receiver point spaced from said transmitter points, and receiving means including
  (1) means for delaying at least one of the instants $t_0$, $t_1'$, and $t_2'$ thereby to simulate the simultaneity of said instants $t_0$, $t_1$, and $t_2$, thereby defining the instants $t_0''$, $t''$, and $t_2''$, respectively,
  (2) means for determining the time difference $\Delta t_{12}''$ between said instants $t_1''$, and $t_2''$,
  (3) means for determining the time difference $\Delta t_m''$ between the said instant $t_0''$ and an instant $t_{12}''$ which is intermediate said instants $t_1''$ and $t_2''$, and
  (4) means for forming the product $\Delta t_{12}'' \cdot \Delta t_m''$, thereby to define a particular positional plane which contains said receiver point and which is at right angles to a straight line drawn through said transmitter points and hence a plane containing said receiver point, the position of which plane is fixed with respect to said known transmitter points.

54. A system as defined in claim 53, further comprising two further transmitters located at two spaced-apart known transmitter points, respectively, a straight line drawn through said last-mentioned transmitter points being at an angle to the straight line drawn through the transmitter points at which the first-mentioned transmitters are located, said further transmitters operating in the same manner as the first-mentioned transmitters whereby a grid of positional planes is formed, and said receiving means also receiving the informational time markers from said further transmitters separately from the informational time markers transmitted by the first-mentioned transmitters thereby to obtain a second positional plane which contains the receiver point and which is at right angles to the straight line drawn through the further transmitters, whereby there is obtained a complete fix.

55. A system as defined in claim 54, wherein the two straight lines are at right angles to each other, thereby forming a Cartesian coordinate grid.

56. A system as defined in claim 55, wherein said transmitter points are so arranged that said straight lines bisect each other.

57. A system as defined in claim 55, wherein one of the first-mentioned transmitter points coincides with one of the further transmitter points.

58. A system as defined in claim 53 wherein said receiving means further comprise means for producing a reference time marker at said instant $t_0$.

59. A system as defined in claim 58, further comprising two further transmitters located at spaced-apart known transmitter points, respectively, a straight line drawn through said last-mentioned transmitter points being parallel to the straight line drawn through the transmitter points at which the first-mentioned transmitters are located, said further transmitters operating in the same manner as the first-mentioned transmitters and said receiving means receiving the informational time markers from said further transmitters separate from the informational time markers transmitted by the first-mentioned transmitters; said receiving means further comprising means for comparing the product defining the distance between the positional plane in which the receiver point is located with respect to a reference plane that is at right angles to said two lines as determined from the informational time markers transmitted by the first-mentioned transmitters with the product defining the distance between the positional plane in which the receiver point is located with respect to said reference plane as determined from the informational time markers transmitted by said further transmitters, and means responsive to any difference between the thus-determined products for so adjusting said means for producing the reference time marker as to make said difference equal to zero.

60. A system as defined in claim 59 wherein said two straight lines coincide with each other.

61. A system as defined in claim 60 wherein one of the first-mentioned transmitter points coincides with one of the further transmitter points.

62. A system as defined in claim 59 wherein one of said first-mentioned transmitters and one of said further transmitters together form a transmitter pair operating in the same manner as the two first-mentioned transmitters whereby a grid of positional planes is formed, said receiving means also receiving the informational time markers from said transmitter pair whereby a complete fix may be obtained.

63. A system as defined in claim 62 wherein a straight line drawn through said transmitter pair is at right angles to said parallel lines, thereby to form a Cartesian coordinate grid.

64. A system as defined in claim 59, further comprising four additional transmitters arranged, in a manner similar to the first four transmitters, on parallel lines which are at right angles to the parallel lines of the first four transmitters, said additional four transmitters being arranged to operate in a manner similar to the first four transmitters and said receiving means being arranged to cooperate with said additional four transmitters, whereby a complete Cartesian coordinate grid is formed allowing a complete fix of said receiver point to be taken.

65. A system as defined in claim 64 wherein at least some of said eight transmitter points coincide with each other.

66. A system as defined in claim 65 wherein there are but five transmitters located along two lines intersecting each other at right angles, one of the five transmitters being located at the intersection.

67. A system as defined in claim 59 wherein said means which are responsive to any difference between the thus-determined products comprise means for calculating the error with which said means for producing the reference time marker produces the same, and means responsive to said error calculating means for adjusting said reference time marker producing means.

68. A system as defined in claim 58 wherein the time difference between said instants $t_1$ and $t_2$ is equal to or greater than the transit time between said two transmitter points.

69. A system as defined in claim 58 wherein one of said transmitters comprises a first signal generator for producing the informational time markers, and a first transmitter unit connected to said first signal generator for transmitting the informational time markers produced thereby, and wherein the other of said transmitters comprises a second signal generator for producing the informational time markers, and a second transmitter unit connected to said second signal generator for transmitting the informational time markers produced thereby, said two transmitters being synchronized to transmit their respective informational time markers in accordance with a desired timed relationship.

70. A system as defined in claim 69, further comprising synchronizing means interconnecting said two transmitters.

71. A system as defined in claim 70 wherein said synchronizing means comprise a connection between said two signal generators for causing said first signal generator to produce a time marker in response to signals produced by said second signal generator, said other transmitter further including a time delay member interposed between said second signal generator and said second transmitter unit for compensating for the time delay produced by said connection.

72. A system as defined in claim 70 wherein said synchronizing means comprise a radio link.

References Cited by the Examiner

UNITED STATES PATENTS

| | | | |
|---|---|---|---|
| 1,406,996 | 2/1922 | Morrill | 343—103 |
| 2,681,764 | 3/1952 | Gale | 235—150.272 |
| 2,970,767 | 2/1961 | Zabb et al. | 235—150.272 |
| 3,020,545 | 2/1962 | Losher | 343—103 |

FOREIGN PATENTS 914,184　12/1962　Great Britain.

CHESTER L. JUSTUS, *Primary Examiner.*

H. C. WAMSLEY, *Assistant Examiner.*